US012227992B2

(12) United States Patent
Hasan

(10) Patent No.: US 12,227,992 B2
(45) Date of Patent: Feb. 18, 2025

(54) CONFIGURABLE STEP ASSISTANT

(71) Applicant: AHA! Solutions, Inc., Mechanicville, NY (US)

(72) Inventor: Sara Hasan, Mechanicville, NY (US)

(73) Assignee: AHA! SOLUTIONS, INC., Mechanicville, NY (US)

( * ) Notice: Subject to any disclaimer, the term of this patent is extended or adjusted under 35 U.S.C. 154(b) by 388 days.

(21) Appl. No.: 16/991,252

(22) Filed: Aug. 12, 2020

(65) Prior Publication Data

US 2021/0047885 A1 Feb. 18, 2021

Related U.S. Application Data

(60) Provisional application No. 62/886,021, filed on Aug. 13, 2019.

(51) Int. Cl.
*E06C 1/00* (2006.01)
*E06C 1/36* (2006.01)

(52) U.S. Cl.
CPC ................ *E06C 1/005* (2013.01); *E06C 1/36* (2013.01)

(58) Field of Classification Search
CPC ... E06C 1/005; E06C 7/06; E06C 5/00; A47B 51/00; A47B 77/10; A47G 25/0614
See application file for complete search history.

(56) References Cited

U.S. PATENT DOCUMENTS 104,569 A * 6/1870 Floyd ...................... E06C 1/387 182/206
560,752 A * 5/1896 Prator et al. ............ E06C 1/387 338/136
2,551,345 A * 5/1951 Scott ....................... B63B 27/14 105/326
3,030,166 A * 4/1962 Baker .................... A47B 77/10 312/235.1
3,481,429 A * 12/1969 Gaede ..................... E06C 1/005 182/88
(Continued)

FOREIGN PATENT DOCUMENTS

CN 106761362 A * 5/2017 .............. E06C 1/36
CN 109662485 A 4/2019
KR 20180099394 A * 9/2018

OTHER PUBLICATIONS

KR 20180099394 Translation (Year: 2018).*
International Search Report and Written Opinion dated Dec. 29, 2020 for PCT/US20/45870.

*Primary Examiner* — Jessica L Laux
*Assistant Examiner* — Kathleen M. McFarland
(74) *Attorney, Agent, or Firm* — Schmeiser, Olsen & Watts LLP

(57) ABSTRACT

A configurable step assistant is provided that includes a first portion configured to be attached to a structure, a second portion pivotally connected to the first portion, the second portion being moveable between a first position and a second position with respect to the first portion, a third portion pivotally connected to the second portion, the third portion being moveable between a first position and a second position with respect to the second portion, wherein, when the second portion is in the second position and the third portion is in the second position, the second portion defines a step for accommodating a user. An associated method is also provided.

8 Claims, 15 Drawing Sheets

(56) References Cited

U.S. PATENT DOCUMENTS

| | | | | | |
|---|---|---|---|---|---|
| 3,833,089 | A * | 9/1974 | Backwell | E06C 1/005 | 182/91 |
| 4,135,604 | A * | 1/1979 | Ryan | E06C 9/06 | 182/91 |
| 4,924,970 | A * | 5/1990 | Seals | E06C 1/005 | 182/195 |
| 5,094,515 | A * | 3/1992 | Low | A47B 46/005 | 182/91 |
| 5,131,492 | A * | 7/1992 | Caminiti | A47B 77/10 | 182/91 |
| 5,358,067 | A * | 10/1994 | Ford | E06C 1/005 | 182/35 |
| 5,505,476 | A * | 4/1996 | Maccabee | B60R 3/02 | 280/166 |
| 5,730,388 | A * | 3/1998 | Alder | D02H 13/00 | 242/899 |
| 5,819,670 | A * | 10/1998 | O'Connor | A47B 5/06 | 182/95 |
| 5,967,255 | A * | 10/1999 | Young | A47B 5/06 | 297/14 |
| 5,967,260 | A * | 10/1999 | Spak | E06C 1/393 | 182/228.3 |
| 6,401,861 | B1 * | 6/2002 | Marszalek | B60R 3/02 | 182/86 |
| 6,659,224 | B2 * | 12/2003 | Medsker | E06C 5/04 | 182/127 |
| 7,677,584 | B2 * | 3/2010 | Raley | E06C 1/387 | 182/127 |
| 7,716,757 | B2 * | 5/2010 | Sumpton | A47K 17/028 | 182/35 |
| 8,365,676 | B1 * | 2/2013 | McAuliff | A47B 5/06 | 108/48 |
| 9,480,342 | B2 * | 11/2016 | White | A47K 17/028 | |
| 9,617,788 | B2 * | 4/2017 | Goodson | E06C 1/005 | |
| 9,883,741 | B2 * | 2/2018 | Demasi, III | A47B 46/005 | |
| 10,214,963 | B2 * | 2/2019 | Simula | E06C 5/04 | |
| 11,131,141 | B2 * | 9/2021 | Pinnock | A47B 46/005 | |
| 2004/0094494 | A1 * | 5/2004 | Klein | A47B 81/02 | 211/119.004 |
| 2005/0173191 | A1 * | 8/2005 | Linzmayer | E06C 5/02 | 182/127 |
| 2006/0272895 | A1 * | 12/2006 | Lavoie | B60R 3/02 | 182/127 |
| 2015/0001005 | A1 * | 1/2015 | Goodson | A47B 77/00 | 182/96 |
| 2018/0363372 | A1 * | 12/2018 | Cornthwaite | A47C 12/00 | |
| 2020/0102788 | A1 * | 4/2020 | Byers | E06C 7/505 | |
| 2020/0378185 | A1 * | 12/2020 | Leng | E06C 7/06 | |
| 2020/0392787 | A1 * | 12/2020 | Navarro | E06C 1/005 | |

* cited by examiner

CONFIGURABLE STEP ASSISTANT

CROSS-REFERENCE TO RELATED APPLICATIONS

This application claims priority to and the benefit of U.S. Provisional Application No. 62/886,021, filed Aug. 13, 2019, and entitled "Configurable Step Assistant," the entire contents of which are hereby incorporated by reference.

FIELD OF TECHNOLOGY

The following relates to embodiments of a configurable step assistant, and more specifically to embodiments of a configurable step assistant for providing a step to accommodate a user that also folds away to save space.

BACKGROUND

Step stools and step ladders allow a person to access or reach items that are normally out of reach for the person. Conventional step stools and step ladders are free-standing structures that are placed on the floor proximate structures for accessing or reaching items associated with the structure. For example, a conventional step stool can be placed on a bathroom floor in front of a sink cabinet so that a child can comfortably use a faucet. As a result, conventional step stools and step ladders occupy key floor space when in use. When not in use, a person must decide to move the conventional step stool or step ladder away from the structure, which still takes up floor space, or leave the step stool or step ladder in position for continued use, which takes up key floor space and potentially blocks or hinders a walkway past the structure.

SUMMARY

An aspect relates to a configurable step assistant comprising:

a first portion configured to be attached to a structure, a second portion pivotally connected to the first portion, the second portion being moveable between a first position and a second position with respect to the first portion, and a third portion pivotally connected to the second portion, the third portion being moveable between a first position and a second position with respect to the second portion, wherein, when the second portion is in the second position and the third portion is in the second position, the second portion defines a step for accommodating a user.

In an exemplary embodiment, the first portion includes at least one vertically extending arm extending upwardly from the second portion and having an attachment head at an end of the at least one vertically extending arm distal from the second portion. The attachment head defines a channel that receives a top edge of a door of the structure in an attached position with respect to the structure, the structure being a cabinet having at least one door with the top edge of the door protruding from a front surface of the cabinet.

In an exemplary embodiment, the first portion includes a connection element that includes a first portion that extends horizontally and a second portion that extends vertically.

In an exemplary embodiment, when the second portion is in the first position, the second portion is parallel to the first portion to reduce a footprint on a floor that supports the structure.

In an exemplary embodiment, when the third portion is in the first position, the third portion is parallel with the second portion to reduce a distance that the configurable step assistant extends from a front surface of the structure.

In an exemplary embodiment, a sliding mechanism is configured to allow a center section of the first portion to be vertically adjusted with respect to leg sections of the first portion.

In an exemplary embodiment, the third portion includes at least one support leg configured to contact a floor for supporting a weight of the user when the user is standing on the second portion.

In an exemplary embodiment, the first portion includes a plurality of holes configured to receive a corresponding pin of the second portion, such that the second portion is vertically adjustable with respect to the first portion.

In an exemplary embodiment, the configurable step assistant further comprises a fourth portion pivotally connected to the first portion, the fourth portion being moveable between a first position and a second position, wherein, when the fourth portion is in the second position, the fourth portion defines an additional step for accommodating the user at a higher elevation from a floor than an elevation from the floor provided by the step, and a fifth portion pivotally connected to the fourth portion, the fifth portion being moveable between a first position and a second position with respect to the fourth portion, wherein, when the fifth portion is in the second position, the fifth portion contacts the step defined by the second portion when the second portion is in the second position.

Another aspect relates to a configurable step assistant for use with a sink cabinet, comprising: a first vertically arm having a first end and a second end distal from the first end, wherein an attachment head located at the first end is configured to engage a top edge of a door of the sink cabinet, a second vertically extending arm having a first end and a second end distal from the first end, wherein an attachment head located at the first end engages a top edge of at least one of: the door of the sink cabinet and a neighboring door residing next to the door of the sink cabinet, a stepping platform pivotally connected to the first vertically extending arm and the second vertically extending arm, the stepping platform residing parallel with respect to a front surface of the sink cabinet in a first position and extending laterally with respect to the front surface of the sink cabinet in a second position, and at least one support leg pivotally connected to the stepping platform, the at least one support leg residing parallel with respect to the stepping platform in a first portion and extending vertically from the stepping platform in a second position to contact a floor supporting the sink cabinet.

In an exemplary embodiment, the attachment head of the first vertically extending arm and the second vertically extending arm includes defines a channel having two side walls and a bottom surface.

In an exemplary embodiment, when the stepping platform is in the first position and the at least one support leg is in the first position, a footprint on the floor that supports the sink cabinet is reduced and a distance that the over-the-door step assistant extends from the front surface of the sink cabinet is reduced with respect to the second position of the stepping platform and the second position of the at least one leg support.

In an exemplary embodiment, the at least one leg support supports a weight of the user when the user is standing on the stepping platform.

In an exemplary embodiment, the first vertically extending arm and the second vertically extending arm each include a plurality of holes configured to receive a corresponding pin of the stepping platform, such that the stepping platform is vertically adjustable with respect to the second end of the arms.

In an exemplary embodiment, the configurable step assistant further comprises an additional stepping platform pivotally connected to the first vertically extending arm and the second vertically extending arm, the additional stepping platform having a reduced tread depth than the stepping platform and being moveable between a first position and a second position, wherein, when the additional stepping platform is in the second position, the additional stepping platform accommodates the user at a higher elevation from the floor than an elevation from the floor provided by the stepping platform, and at least one intermediate leg support pivotally connected to the additional stepping platform, the at least one intermediate leg support being moveable between a first position and a second position with respect to the additional stepping platform, wherein, when the at least one intermediate leg support is in the second position, the at least one intermediate leg support contacts the stepping platform when the stepping platform is in the second position.

Another aspect relates to a configurable step assistant for use with a cabinet, comprising: a standing structure having two leg sections and a center section operably connected to the two leg sections, a connection element operably connected to the center section and configured to engage a top edge of a door of the cabinet; a stepping platform pivotally connected to at least one of the two leg sections, the stepping platform residing parallel with respect to a front surface of the cabinet in a first position and extending laterally with respect to the front surface of the cabinet in a second position; and at least one support leg connected to the stepping platform.

Another aspect relates to a method comprising providing a configurable step assistant for attachment to a structure, the configurable step assistant including a first portion configured to be attached to the structure, a second portion pivotally connected to the first portion, and a third portion pivotally connected to the second portion, wherein, the configurable step assistant is configured to be moved into a stowed position to maximize a clearance area around the structure and moved into an operable position to provide a step for accommodating a user at a higher elevation with respect to a floor surface.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

Figure 1:
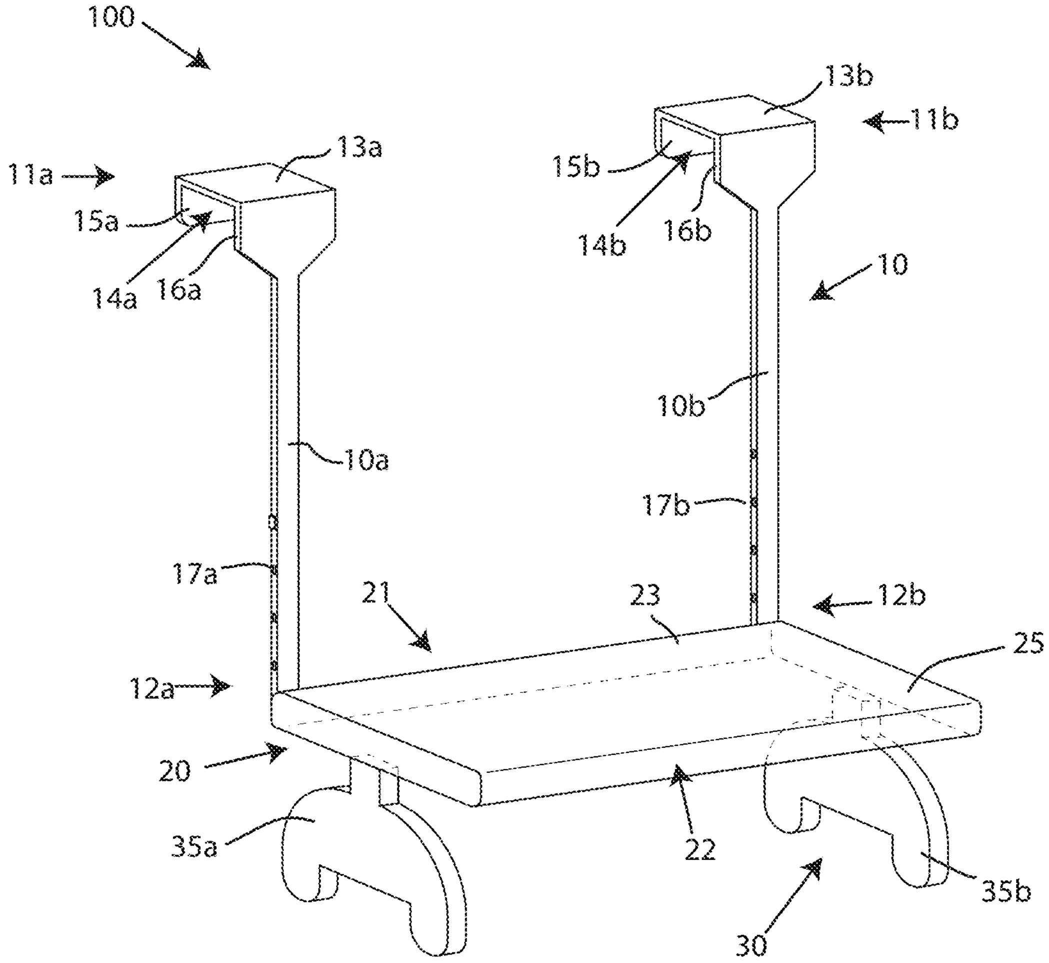
FIG. 1 depicts a perspective view of a configurable step assistant, in accordance with embodiments of the present invention.

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms “a”, “an” and “the” include plural referents, unless the context clearly dictates otherwise.

Embodiments of the present invention relate to a configurable step assistant that allows a user to reach or use items normally out of reach for the user while also stowing away so that floor space is saved and walkways are maximized when not in use. The configurable step assistant is used in conjunction with a structure to allow the user to reach or use items associated with the structure. Examples of the structure include a sink cabinet having a faucet and a sink, a base cabinet, a shelving system, or any object or fixture that includes a corresponding support element for engagement with the configurable step assistant. The corresponding support element is part of the structure that is used to attach the configurable step assistant to the structure such that the configurable step assistant is suspended from, supported by, or otherwise attached to the structure. Examples of the corresponding support element include a door of a cabinet, door hardware, cabinet hardware, drawer hardware, countertop, a ledge, a custom mechanical element designed for connecting the configurable step assistant to the structure, pulls, pins, handles, and the like, which are conventionally part of the structure or are designed to work with the structure for the purposes of supporting the configurable step assistant. A corresponding support element not conventionally part of the structure can be mounted to the structure for supporting the configurable step assistant. For example, a horizontal bar may be mounted to a surface of the structure for suspending or otherwise attached the configurable step assistant. The configurable step assistant can be attached to the structure so that the configurable step assistant resides on the outside of the structure or within the structure (e.g. inside a cabinet), when not in use.

The configurable step assistant is a step, step stool, step ladder, step, etc. that engages the structure in such a way that the step assistant can be configured in multiple different positions based on a need or desire of the user. For instance, the configurable step assistant can be manipulated by the user to be in an operable position that allows the user to step onto a step of the configurable step assistant to access or use item(s) associated with the structure that the user cannot or cannot comfortably use or access while standing on the floor. When the user no longer needs to the reach or use the item(s) associated with the structure, the user can manipulate the configurable step assistant to stow away the configurable step assistant in a hideaway position so that the area around the structure and the floor space by the structure is cleared of the step assistant. In this way, the configurable step assistant allows the user to reach or use items normally out of reach for the user while also stowing away so that floor space is saved and walkways are maximized when not in use.

Referring to the drawings, FIG. 1 depicts a perspective view of a configurable step assistant 100, in accordance with embodiments of the present invention. The configurable step assistant 100 includes a first portion 10, a second portion 20, and a third portion 30. The first portion 10 is configured to be attached to a structure, such as a cabinet having at least one door. The first portion 10 enables the configurable step assistant 100 to be attached, mounted, or suspended from the structure. In the illustrated embodiment, the first portion includes a first vertically extending arm **10*a* and a second vertically extending arm 10*b*. The first vertically extending arm 10*a* includes a first end 11*a* and a second end 12*a* that is opposite the first end 11*a*. An attachment head 13*a* is located at the first end 11*a* for engaging a portion of the structure to implement that attachment or partial attachment of the step assistant 100 to the structure. The attachment head 13*a* is a structural element that is sized and dimensioned to cooperate with the corresponding structural element of the structure. In the illustrated embodiment, the attachment head 13*a* comprises a first sidewall 15*a* and a second sidewall 16*a* connected together by a flat surface to define a channel 14*a*. The channel 14*a* receives the corresponding structural element of the structure to removably secure at least the first vertically extending arm 10*a*** to the structure.

Similarly, the second vertically extending arm **10*b* includes a first end 11*b* and a second end 12*b* that is opposite the first end 11*b*. An attachment head 13*b* is located at the first end 11*b* for engaging a portion of the structure to implement that attachment or partial attachment of the step assistant 100 to the structure. The attachment head 13*b* is a structural element that is sized and dimensioned to cooperate with the corresponding structural element of the structure. In the illustrated embodiment, the attachment head 13*b* comprises a first sidewall 15*b* and a second sidewall 16*b* connected together by a flat surface to define a channel 14*b*. The channel 14*b* receives the corresponding structural element of the structure to removably secure at least the first vertically extending arm 10*a*** to the structure.

Figure 2:
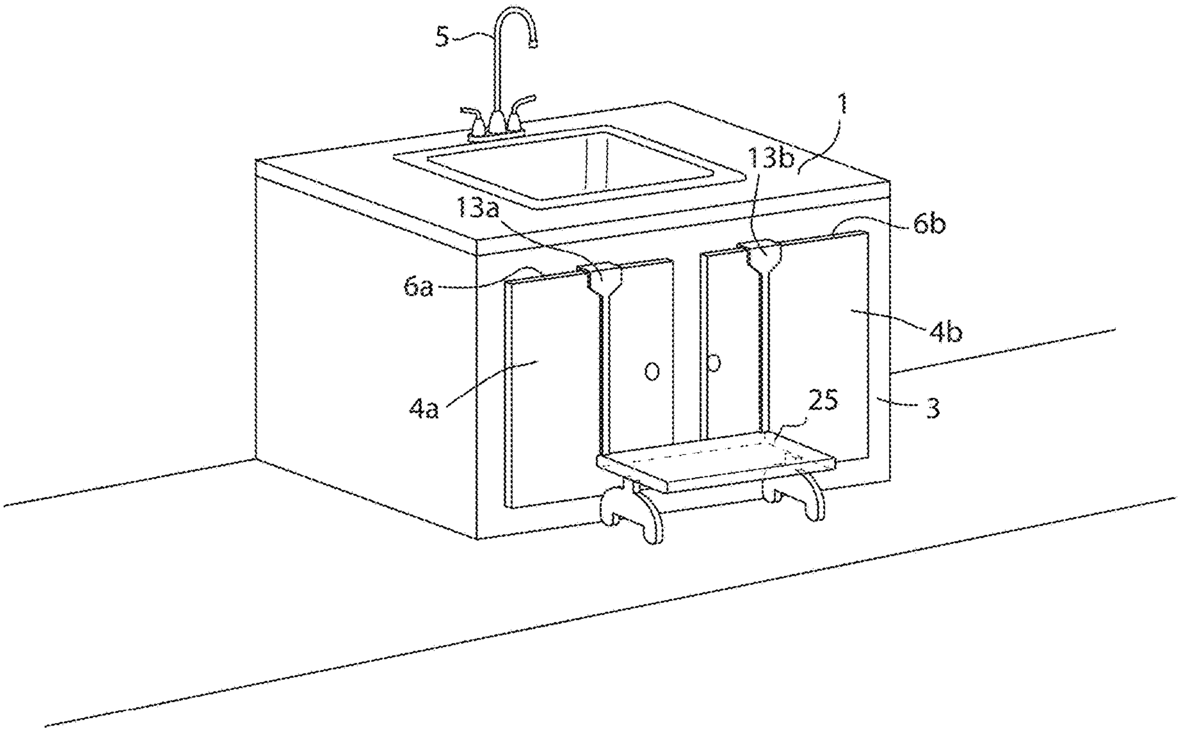
FIG. 2 depicts a perspective view of the configurable step assistant attached to a structure, in accordance with embodiments of the present invention.
Figure 8:
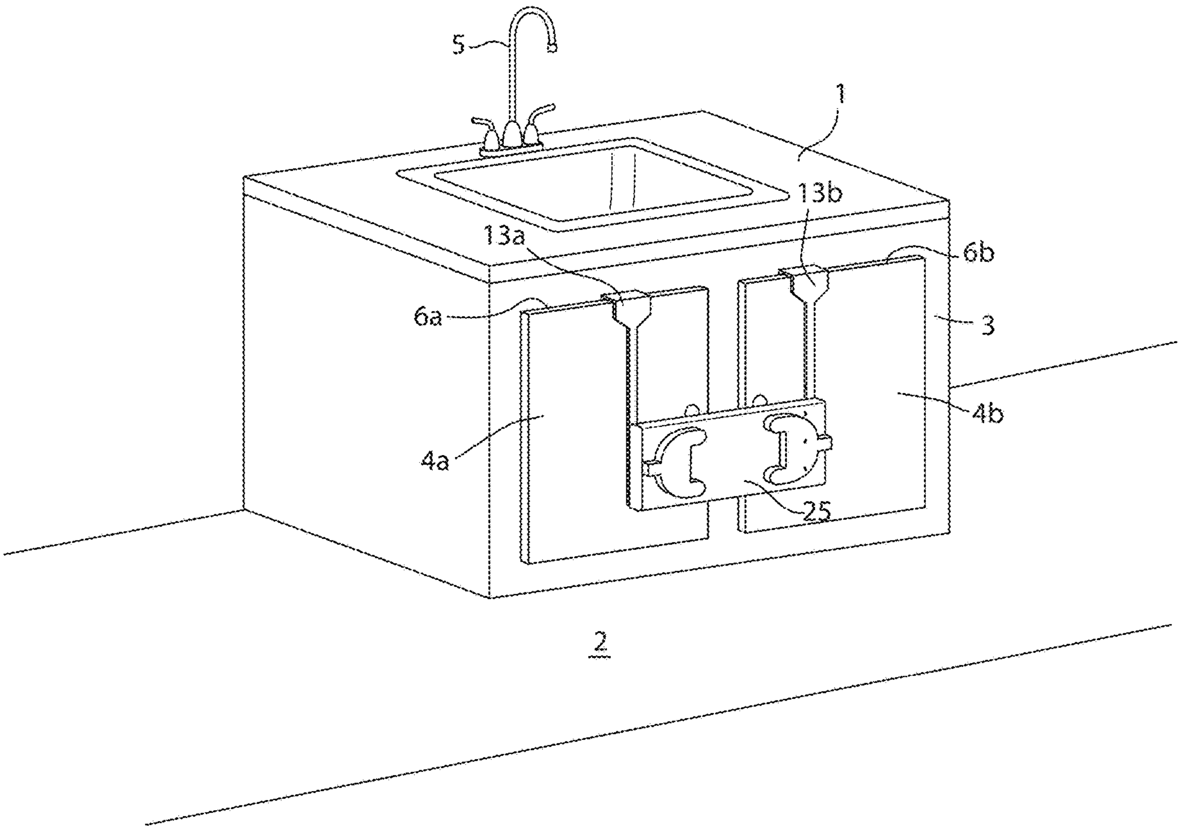
FIG. 8 depicts a perspective view of the configurable step assistant attached to the structure and in a stowed position, in accordance with embodiments of the present invention.

FIG. 2 depicts a perspective view of the configurable step assistant 100 attached to a structure 1, in accordance with embodiments of the present invention. The structure 1 includes an object 5 that a user may desire to access or use that may normally be out of reach for the user. Here, the structure 1 is a sink cabinet having a sink and faucet that is out of reach for a child without the use of the step assistant 100. The sink cabinet includes two side-by-side doors **4*a*, 5*b* located on a front surface 3 of the sink cabinet. As shown in the illustrated embodiment, the channel 14*a* of the attachment head 13*a* receives a top edge 6*a* of a first door 4*a*. The top edge 6*a* of the door 4*a* fits within the channel 14*a* and the mechanical engagement between the flat surface connecting the sidewalls 15*a*, 16*a* supports the step assistant 100 such that the step assistant does not fall onto the ground due to gravity. The attachment head 13*a* may be sized and dimensioned so that the top edge 6*a* of the door 4*a* fits snugly in the channel 14*a* in such a way that the sidewalls 15*a*, 16*a* also engage at least partially the sides of the door 4*a* proximate the top edge 6*a* to prevent or hinder back and forth movement of the step assistant 100 with respect to the structure 1. Similarly, the channel 14*b* of the attachment head 13*b* receives a top edge 6*b* of a second door 4*b*. The top edge 6*b* of the door 4*b* fits within the channel 14*b* and the mechanical engagement between the flat surface connecting the sidewalls 15*b*, 16*b* supports the step assistant 100 such that the step assistant does not fall onto the ground due to gravity. The attachment head 13*b* may be sized and dimensioned so that the top edge 6*b* of the door 4*b* fits snugly in the channel 14*b* in such a way that the sidewalls 15*b*, 16*b* also engage at least partially the sides of the door 4*b* proximate the top edge 6*b* to prevent or hinder back and forth movement of the step assistant 100 with respect to the structure 1. While the position shown in FIG. 2 depicts the third portion 30 of the step assistant 100 contacting the ground, the interaction between the attachment heads 13*a***, 13*b* and the doors 4*a*, 4*b* suspends the step assistant 100 from the structure 1 above the floor when the third portion 30 is stowed away, as shown in FIG. 8.

In alternative embodiments, the attachment heads of the arms include a different structural configuration than shown in the illustrated embodiments. For example, the attachment heads may include a plurality of fingers that are designed to latch onto the corresponding structural element of the structure. The attachment heads could include a magnetic strip that magnetically attaches to a corresponding magnetic strip placed on the structure, or may be adhered to the structure. In another alternative embodiment, the first portion 10 is attached to the corresponding structural element using a different method than the attachment heads 13*a*, 13*b*. For example, the first end 11*a*, 11*b* of the arms 10*a*, 10*b*, respectively, can be permanently fastened to the structure using a conventional fastening element, such as a screw or nut and bolt arrangement. Moreover, the first portion 10 of the step assistant 100 can be attached to structures that have a single door. For instance, in a single door cabinet, both arms 10*a*, 10*b* attach to the same door of the cabinet at different locations along the top edge of the single door. In further embodiments, the first portion 10 includes a single vertically extending arm, such that at least one arm is attached to the structure. The single arm could be positioned proximate a center of the stepping platform 25, as opposed to two arms 10*a*, 10*b* positioned at the sides of the stepping platform 25, as shown in FIG. 2.

Referring back to FIG. 1, the second portion 20 includes a first end 21 and a second end 22 that is opposite to the first end 21. The second portion 20 is defined by a stepping platform 25 that acts as a step or surface that the user can step onto to access or use an object associated with the structure. The stepping platform 25 has a width measured from side-to-side of the stepping platform 25 and a tread depth measured from the first end 21 to the second end 22. The surface 23 of the stepping platform 25 forms a continuous surface area to accommodate the user when the step assistant 100 is in use. The surface 23 can include friction elements, such as bumps, grooves, grip tape, knurling, raised surface projections, and the like, to prevent or hinder slipping while the user is standing on the stepping platform 25. Optionally, the surface 23 includes a plurality of openings extending through a thickness of the stepping platform 25 to reduce a total weight of the stepping platform 25. The thickness of the stepping platform 25 varies depending on a total weight that needs to be supported by the step assistant 100.

Moreover, the second portion 20 of the configurable step assistant 100 is pivotally connected to the first portion 10. For instance, the stepping platform 25 is pivotally connected to the first vertically extending arm 10*a* and the second vertically extending arm 10*b* at discrete points along an edge of the stepping platform 25 at the first end 21 of the stepping platform 25. In the embodiment illustrated in FIG. 1, the platform 25 is pivotally connected to the first vertically extending arm 10*a* at a left, back corner of the stepping platform 25 and is pivotally connected to the second vertically extending arm 10*b* at a right, back corner of the stepping platform 25. In alternative embodiments, the arms 10*a*, 10*b* are attached to the stepping platform 25 at locations other than the corners of the stepping platform 25. In embodiments where the first portion 10 includes only a single arm, the single arm is mounted proximate or directly at the center of the back edge of the stepping platform 25. Furthermore, various mechanical connections can be used to enable the pivoting of the stepping platform 25 with respect to the arms 10*a*, 10*b*. In one embodiment, the mechanical connection is a cylindrical pin or bolt attached to each side of the stepping platform 25 at the first end 21 that fits into a through-hole 17*a*, 17*b* located on a side of the arms 10, 10*b*, respectively. The through-holes 17*a*, 17*b* are located on either an outer face of the arms 10*a*, 10*b* (see 17*a*) or an inner face of the arms 10*a*, 10*b* (see 17*b*). The pin extends through the through-hole 17*a*, 17*b* such that an end of the pin is exposed on the other side of the arm 10*a*, 10*b*; a nut or similar securing fastener can be attached to the exposed end of the pin. In another embodiment, the mechanical connection is a hinge that permits the stepping platform 25 to hingedly move with respect to the first portion 10. In another embodiment, the mechanical connection is a pivot lever.

Figure 3:
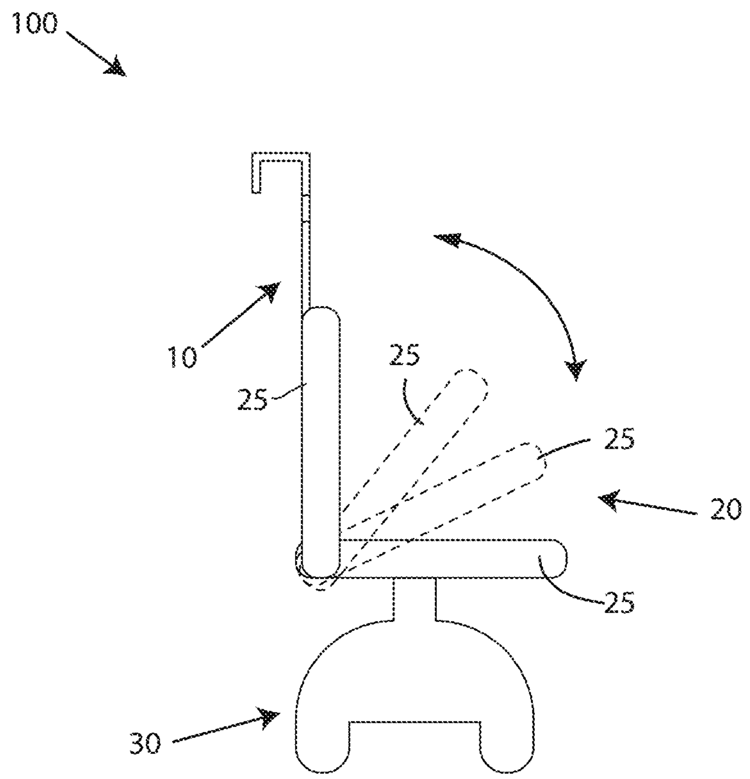
FIG. 3 depicts a motion of a second portion with respect to a first portion, in accordance with embodiments of the present invention.

FIG. 3 depicts a motion of the second portion 20 with respect to the first portion 10, in accordance with embodiments of the present invention. The motion of the stepping platform 25 is indicated by the double-sided arrow. The stepping platform 25 can be pivotally moved with respect to the first portion 10 towards and away from the structure depending on a desired position of the step assistant 100. The stepping platform 25 is pivoted along an axis extending parallel with the back edge of the stepping platform 25. Accordingly, the second portion 20 is movable between a first position and a second position with respect to the first portion 10. When the second portion 20 (e.g. stepping platform 25) is in the first position, the second portion 20 is parallel to the first portion 10 to reduce a footprint on a floor that supports the structure. When the second portion 20 (e.g. stepping platform 25) is in the second position, the second portion 20 defines a step for accommodating the user. In other words, the stepping platform 25 resides parallel with respect to a front surface of the structure in the first position and extends laterally with respect to the front surface of structure in the second position. A latch or similar mechanical means located on one or both of the arms 10*a*, 10*b* can be used to maintain the stepping platform 25 in the vertical orientation of the first position.

The stepping platform 25 is optionally vertically adjustable. The stepping platform 25 can be adjusted up or down in height by shortening or lengthening the arms 10*a*, 10*b* of the first portion 10. The arms 10*a*, 10*b* are adjustable due to a construction of the arms 10*a*, 10*b*. Each arm 10*a*, 10*b* may include an outer component (e.g. pole, bar, etc.) and an inner component (e.g. pole, bar, etc.) that snugly fits into the outer pole. The inner component can be extended out of, or pushed into, the outer component pole in order to adjust the height of the stepping platform 25. The stepping platform 25 is attached to the outer component. The outer component has a plurality of holes on the side of the outer component that are used for height adjustment, by pushing in a click-button that is extending out of the holes from the inner component and moving the inner component accordingly so that the click-button clicks and holds the structure at the current height according to the hole opening it is located in (see FIG. 9). Pushing in on the button allows a user to move the inner component up or down (shorter or longer), as the button will click into the new hole that it is moved to. Moreover. the different sizes/shape of the holes on the arms 10*a*, 10*b* may differentiate between the bottom step adjustment levels and the optional second step adjustment levels. In an exemplary embodiment, the two hole sets can be different (either size or shape). If the bottom step has five holes for height adjustment, the optional second step will also have five different holes, since the distance between the two steps is fixed. In other words, if the bottom step is locked into the fourth hole from the bottom, the optional second step will also lock in to the 4th hole from the bottom of its hole set as well. The main reason for this adjustment is since bathroom cabinet doors can be at different heights, the bottom step's feet will be touching the floor so that the step can be used safely.

Figure 4:
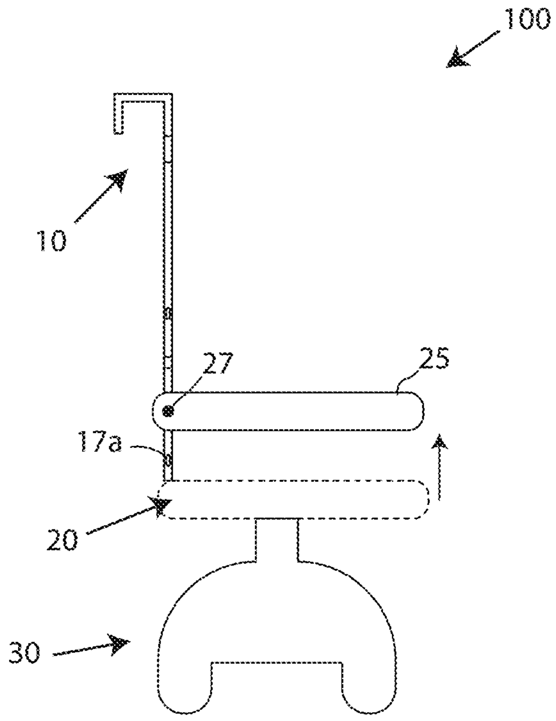
FIG. 4 depicts a stepping platform being vertically adjustable from an initial position to a new position, in accordance with embodiments of the present invention.

FIG. 4 depicts the stepping platform 25 being vertically adjustable from an initial position to a new position, in accordance with an alternative embodiment of the present invention. Each through-hole 17*a*, 17*b* of the arms 10*a*, 10*b*, respectively, can be used to set a height of the stepping platform 25 from the floor. A pin 27 is inserted through a bore of the stepping platform 25 and through the through-hole 17*a* to secure the stepping platform 25 at various heights from the floor, depending on the locations of the through holes 17*a*, 17*b*. Thus, a user can release the pin 27 on both sides of the stepping platform 25, raise or lower the stepping platform 25 to align the stepping platform 25 with a desired through hole 17*a*, 17*b*, and insert the pin 27 to lock the stepping platform 25 to a desired height.

Referring back to FIG. 1, the third portion 30 includes a first support leg 35*a* and a second support leg 35*b*. The support legs 35*a*, 35*b* are configured to contact a floor for supporting a weight of the user when the user is standing on the second portion 20. In the illustrated embodiment, the third portion 30 includes two support legs 35*a*, 35*b* that include feet that contact the floor when the third portion 30 is extended from the second portion 20. The support legs 35*a*, 35*b* are attached to an underside of the stepping platform 25 proximate the sides of the stepping platform 25. In alternative embodiment, the third portion 30 includes a single support leg that attaches to the underside of the stepping platform 25 proximate or directly at a center of the underside of the stepping platform 25.

Moreover, the third portion 30 of the step assistant 100 is pivotally connected to the second portion 20. For instance, each support leg 35*a*, 35*b* is pivotally connected to the stepping platform 25 at discrete points along an underside of the stepping platform 25. In the embodiment illustrated in FIG. 1, the support leg 35*a* is pivotally connected to the stepping platform 25 at a left side of the stepping platform 25 and the support leg 35*b* is pivotally connected to the stepping platform 25 at a right side of the stepping platform 25. In alternative embodiments, the support legs 35*a*, 35*b* are attached to the stepping platform 25 at locations other than the sides of the stepping platform 25. In embodiments where the third portion 30 includes only a single support leg, the single support leg is mounted proximate or directly at the center of the underside of the stepping platform 25. Furthermore, various mechanical connections can be used to enable the pivoting of the support legs 35*a*, 35*b* with respect to the stepping platform 25. In one embodiment, the mechanical connection is a cylindrical pin or bolt connecting the support legs 35*a*, 35*b* to the stepping platform 25 in a hinged manner. In another embodiment, the mechanical connection is a hinge that permits the support leg 35*a*, 35*b* to hingedly move with respect to the second portion 20. In another embodiment, the mechanical connection is a pivot lever.

Figure 5:
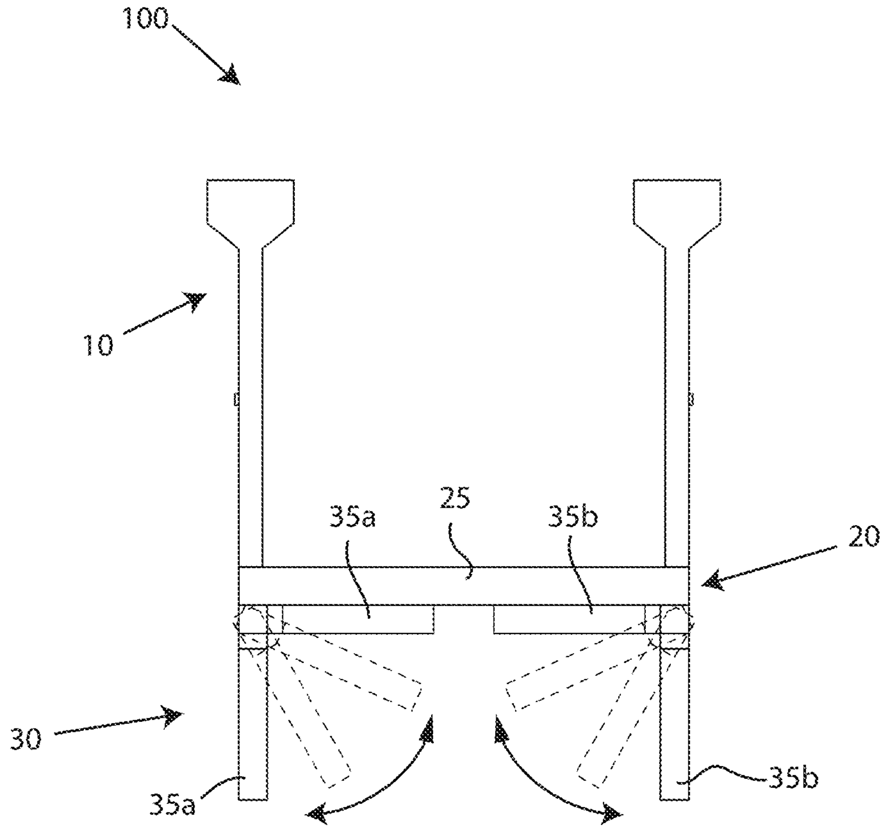
FIG. 5 depicts a motion of a third portion with respect to the second portion, in accordance with embodiments of the present invention.

FIG. 5 depicts a motion of the third portion 30 with respect to the second portion 20, in accordance with embodiments of the present invention. The motion of the support legs 35*a*, 35*b* is indicated by the double-sided arrows. Each support leg 35*a*, 35*b* can be pivotally moved with respect to the second portion 10 towards and away from the underside of the stepping platform 25 depending on a desired position of the step assistant 100. The support legs 35*a*, 35*b* are pivoted along an axis extending transverse or perpendicular with the back edge of the stepping platform 25. In other words, the direction of movement of the support legs 35*a*, 35*b* is opposite to the direction of movement of the stepping platform 25. The stepping platform 25 is moved towards and away from the structure, while the support legs 35*a*, 35*b* are moved from side-to-side with respect to the structure. The difference in direction of movement allows the step assistant 200 to be optimally stowed away, as described in greater detail infra. Accordingly, the third portion 30 is movable between a first position and a second position with respect to the second portion 20. When the third portion 30 (e.g. at least one support leg) is in the first position, the third portion 30 is parallel with the second portion 30 to reduce a distance that the configurable step assistant 100 extends from the front surface of the structure. When the third portion 30 (e.g. at least one support leg) is in the second position, the third portion 30 contacts the floor to support a weight of the user standing on the second portion 20. In other words, the at least one support leg resides parallel with respect to the stepping platform 25 in the first portion and extends vertically from the stepping platform 25 in the second position to contact a floor supporting the structure. A latch or similar mechanical means located on the underside of the stepping platform 25 can be used to maintain the support legs 35*a*, 35*b* in the folded orientation of the first position.

Figure 6:
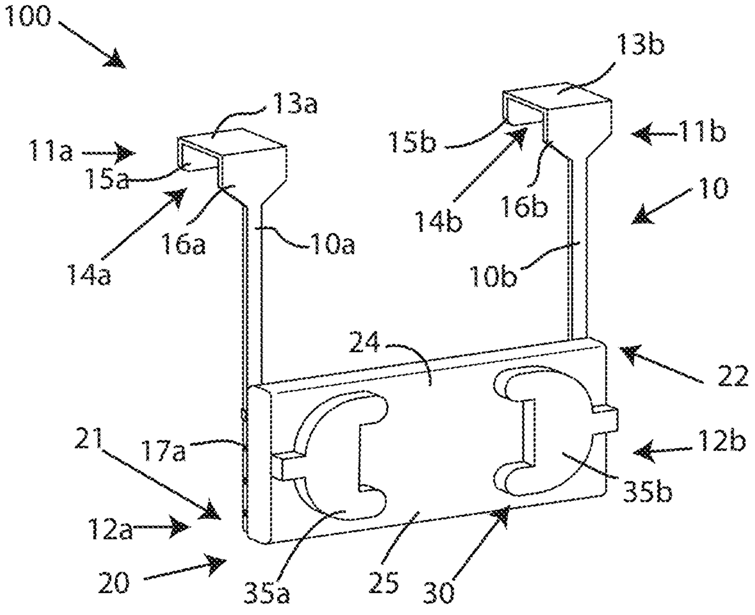
FIG. 6 depicts a perspective view of the configurable step assistant when the second portion and the third portion are both in respective first positions, in accordance with embodiments of the present invention.

FIG. 1 depicts the configurable step assistant 100 when the second portion 20 and the third portion 30 are both in the respective second positions. FIG. 6 depicts a perspective view of the configurable step assistant 100 when the second portion 20 and the third portion 30 are both in respective first positions, in accordance with embodiments of the present invention. As shown, the stepping platform 25 resides against or near the arms 10*a*, 10*b* in a vertical orientation with the underside 24 of the stepping platform 25 facing outwardly. The support legs 35*a*, 35*b* reside against or near the underside 24 of the stepping platform 25. The difference in the direction of movement between the stepping platform 25 and the support legs 35*a*, 35*b* allow for a minimal profile of the step assistant 100.

Figure 7:
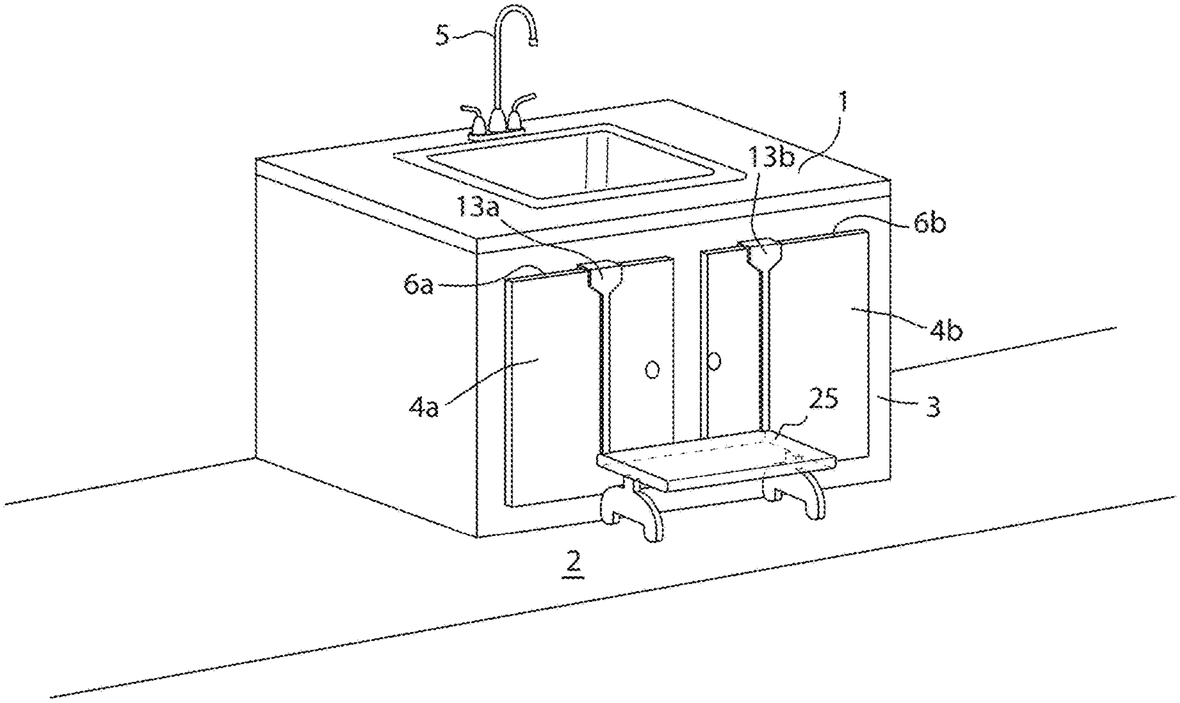
FIG. 7 depicts a perspective view of the configurable step assistant attached to the structure and in an operable position, in accordance with embodiments of the present invention.

The manner in which the configurable step assistant 100 is configured between an operable position and a stowed position will now be described. FIG. 7 depicts a perspective view of the configurable step assistant 100 attached to the structure and in an operable position, in accordance with embodiments of the present invention. In the operable position, the step assistant 100 can be stepped on by the user to access, reach or use an object 5 associated with the structure 1. By way of example, the stepping platform 25 is folded down in the second position and the support legs 35*a*, 35*b* are folded down in the second position so that the user can step onto and stand on the stepping platform 25 to use the faucet of the bathroom sink from an elevation higher than the floor 2. In the operable position, the configurable step assistant 100 takes up key floor space on the floor 2 because the stepping platform 25 extends laterally from the front surface 3 of the cabinet and the support legs 35*a*, 35*b* rest on the floor 2. In bathrooms where a walkway between the bathroom sink and another object, such as a door, a doorway, wall or a tub, is limited, the presence of the step assistant 100 further reduces or blocks the walkway. To maximize a clearance around the structure (e.g. clear the walkway), the configurable step assistant 100 can be moved into a stowed position when the step assistant 100 is not in use. FIG. 8 depicts a perspective view of the configurable step assistant 100 attached to the structure and in a stowed position, in accordance with embodiments of the present invention. In the stowed position, a footprint of the step assistant 100 is eliminated and a distance that the configurable step assistant 100 extends from the front surface 3 of the structure 1 is reduced or minimized. To move the step assistant 100 from the operable position to the stowed position, the user grips the stepping platform 25 and lifts the stepping platform 25 upwardly to stow the stepping platform 25 in a vertical orientation parallel with the structure 1, and grips the support legs 35*a*, 35*b* and one-by-one or simultaneously pushes the support legs 35*a*, 35*b* towards the underside of the stepping platform 25. In the stowed position, the configurable step assistant 100 does not take up key floor space on the floor 2 because the stepping platform 25 does not extend laterally from the front surface 3 of the structure 1 and the support legs 35*a*, 35*b* are off of the floor 2 and instead folded flat onto the stepping platform 25. In bathrooms where the walkway between the bathroom sink and another object, such as a wall or a tub, is limited, the ability to stow away the step assistant 100 to free up the walkway can be appreciated by the user. Additionally, the configurable step assistant 100, when attached to the structure 1, can act as a safety measure/child-resistant solution. By way of example, if the arms 10*a*, 10*b* are attached to both doors in a side-by-side door arrangement of a cabinet, the configurable step assistant 100 can prevent the doors from being fully opened and accessed by a young child.

Figure 9:
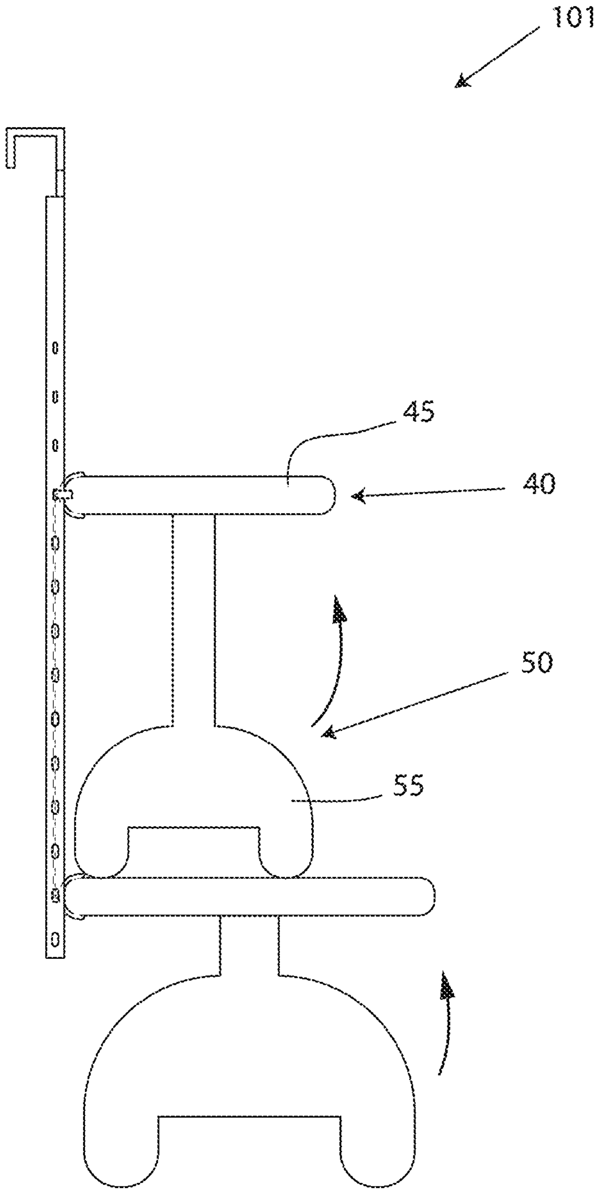
FIG. 9 depicts a side view of a second embodiment of the configurable step assistant, in accordance with embodiments of the present invention.
Figure 10:
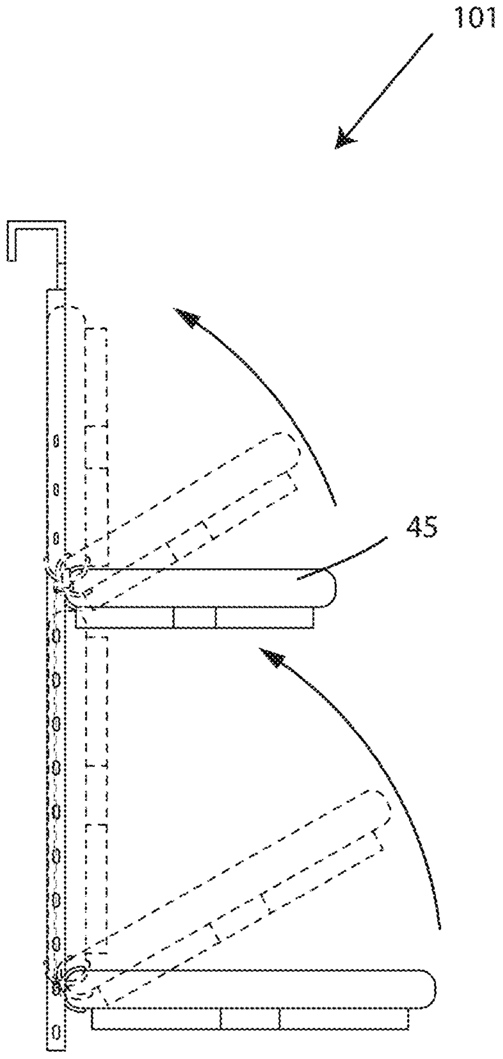
FIG. 10 depicts a side view of a motion of the second embodiment of the configurable step assistant, in accordance with embodiments of the present invention.
Figure 11:
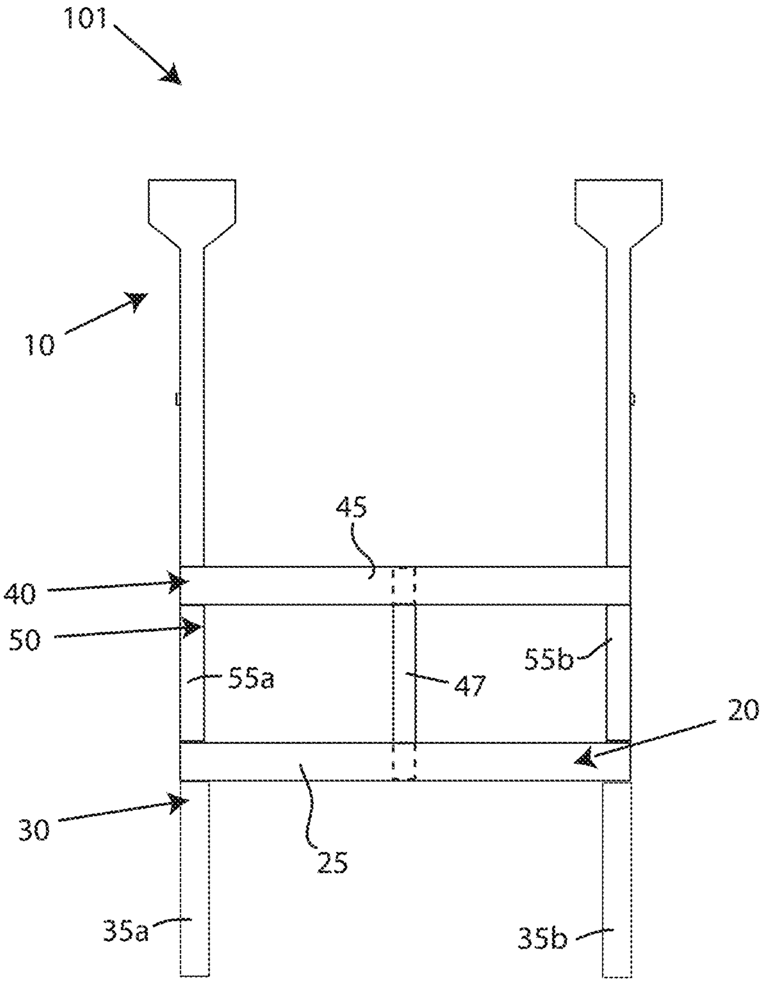
FIG. 11 depicts a front view of the second embodiment of the configurable step assistant, in accordance with embodiments of the present invention.

FIGS. 9-11 depict another embodiment of a configurable step assistant 101. The configurable step assistant 101 includes the same or substantially the same structure and/or function as the configurable step assistant 100. However, the configurable step assistant 101 also includes an additional step 45. In particular, the configurable step assistant 101 includes a fourth portion 40 pivotally connected to the first portion 10. In an exemplary embodiment, the pivotal connection between the fourth portion 40 and the first portion 10 includes an axle member that spans between the first arm 10*a* and the second arm 10*b*; ends of the axle member may be positioned in corresponding holes on the arms 10*a*, 10*b* at a same vertical position along the arms 10*a*, 10*b*, respectively. The fourth portion 40 may include a bore that is sized and dimensioned to fit the axle member therethrough. The fourth portion 40 is moveable between a first position and a second position in a similar manner as described above with respect to the movement between the second portion 20 and the first portion 10. When the fourth portion 40 is in the second position, the fourth portion 40 defines the additional step 45 for accommodating the user at a higher elevation from a floor than an elevation from the floor provided by the stepping platform 25 of the second portion 20. The additional step 45 can be stowed away similar to the stepping platform 25 described above. Further, the additional step 45 may have a tread depth that is less than the tread depth of the stepping platform 25.

Furthermore, the configurable step assistant 101 includes a fifth portion 50 pivotally connected to the fourth portion 40. The fifth portion 50 is moveable between a first position and a second position with respect to the fourth portion 40 in a similar manner as described above with respect to the movement between the third portion 30 and the second portion 20. When the fifth portion 50 is in the second position, the fifth portion 50 contacts the stepping platform 25 when the second portion 20 is in the second position. The fifth portion 50 includes at least one support leg, for example, legs 55*a*, 55*b* that are similar to support legs 35*a*, 35*b*. As shown in FIG. 11, the third portion 30 is connected to the fourth portion 40 by a support arm 47. The support 47 connects step 45 and step 25 in an operable position to provide added stability to the step assistant 101. The support arm 47 can be permanently connected to the step 45 and removably attached to the step 25, or vice versa.

Figure 12:
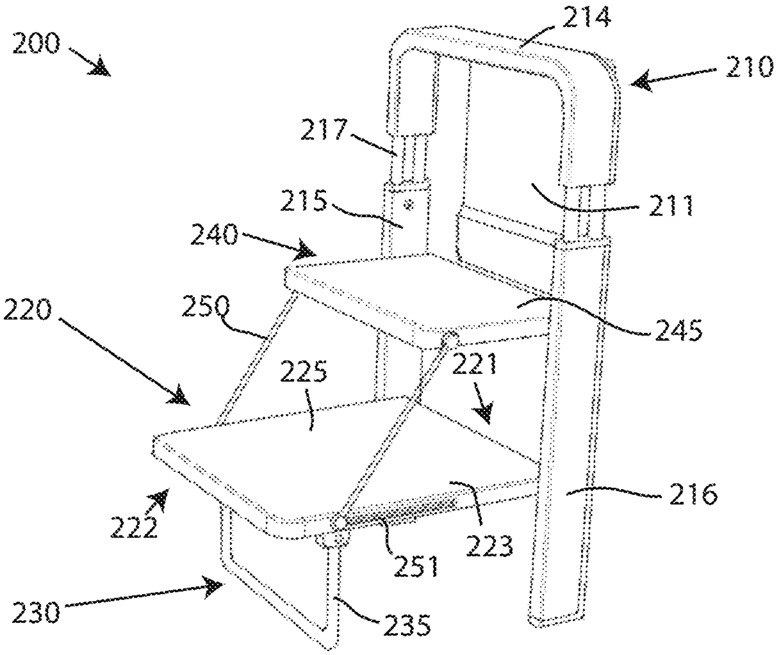
FIG. 12 depicts a front, perspective view of a third embodiment of the configurable step assistant, in accordance with embodiments of the present invention.
Figure 13:
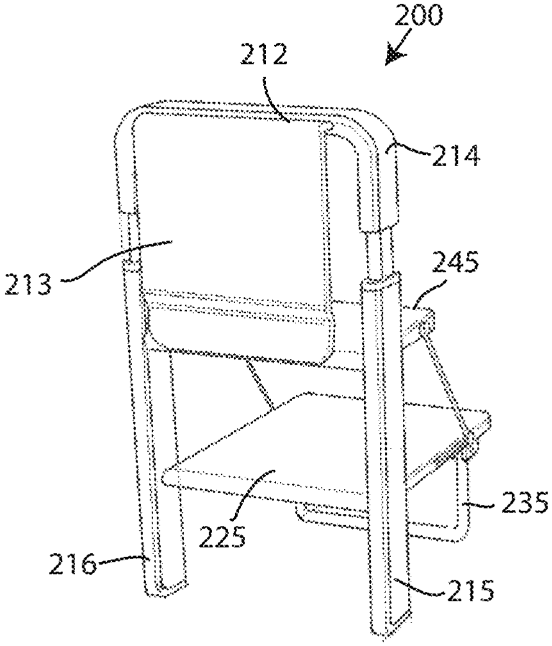
FIG. 13 depicts a rear, perspective view of the third embodiment of the configurable step assistant, in accordance with embodiments of the present invention.

Referring still to the drawings, FIGS. 12-13 depict another embodiment of a configurable step assistant. The configurable step assistant 200 includes a first portion 210, a second portion 220, and a third portion 230. The first portion 210 is configured to be attached to a structure, such as a cabinet having at least one door. The first portion 210 enables the configurable step assistant 200 to be attached, mounted, or suspended from the structure. In the illustrated embodiment, the first portion 210 includes a connection element 211. The connection element 211 is configured to attach to a support element of the supporting structure, such as structure 1, to at least temporarily secure the step 200 to the supporting structure. The connection element 211 is a structural element that is sized and dimensioned to cooperate with the corresponding structural element of the structure. The connection element 211 includes a first portion 212 that extends outwardly to span a thickness of a supporting element (e.g. cabinet door thickness) and a second portion 213 that bends approximately 90° with respect to the first portion 212 and extends vertically a desired distance. Due to the configuration of the connection element 211, a cabinet door or other supporting element of the supporting structure may be received between the first portion 212 and the second portion 213. The connection element may be a plate that engages a front surface or inner surface of a cabinet door when the step assistant 200 is secured to the supporting structure. Although the connection element 211 is shown as one, integral component, two or more separate components may be used to fulfill the purpose of the connection element 211. One or more sides of the connection element 211 may be covered or coated with a soft material to prevent surface damage to the supporting element of the supporting structure.

The configurable step assistant 200 is configured to be attached to a structure, such as structure 1 shown in FIG. 2. In an exemplary embodiment, the first portion 212 of the connection element 211 rests atop a top edge of a cabinet door and the second portion 213 of the connection element 211 may or may not contact a front or rear face of the cabinet door, depending on whether the step assistant 200 is mounted for inside or outside stowing. The mechanical engagement between the connection element 211 and the structure 1 supports or suspends the step assistant 200 such that the step assistant 200 does not fall onto the ground due to gravity. The connection element 211 may be sized and dimensioned so that the top edge 6*a* of the door 4*a* fits snugly to prevent or hinder back and forth movement of the step assistant 200 with respect to the structure 1.

The first portion 210 is a standing structure having two leg sections 215, 216 and a center section 214. The leg sections 215, 216 are configured to provide additional support and stability to the step assistant 200. A bottom end of the leg sections 215, 216 are configured to contact a ground surface or a flat, support surface for added stability and to reduce a stress placed on the supporting element of the structure. The center section 214 is adjustably connected to both the leg sections 215, 216. For instance, the center section 214 can be adjusted vertically using a sliding mechanism 217 to accommodate for different size structures, supporting elements, and the like. In the illustrated embodiment, the sliding mechanism 217 includes a slide bar inserted within the leg sections 215, 216 and each end of the center section 214. The center section 214 is slidable in a vertical direction along the bars for adjusting a height of the step assistant 200.

Figure 14A:
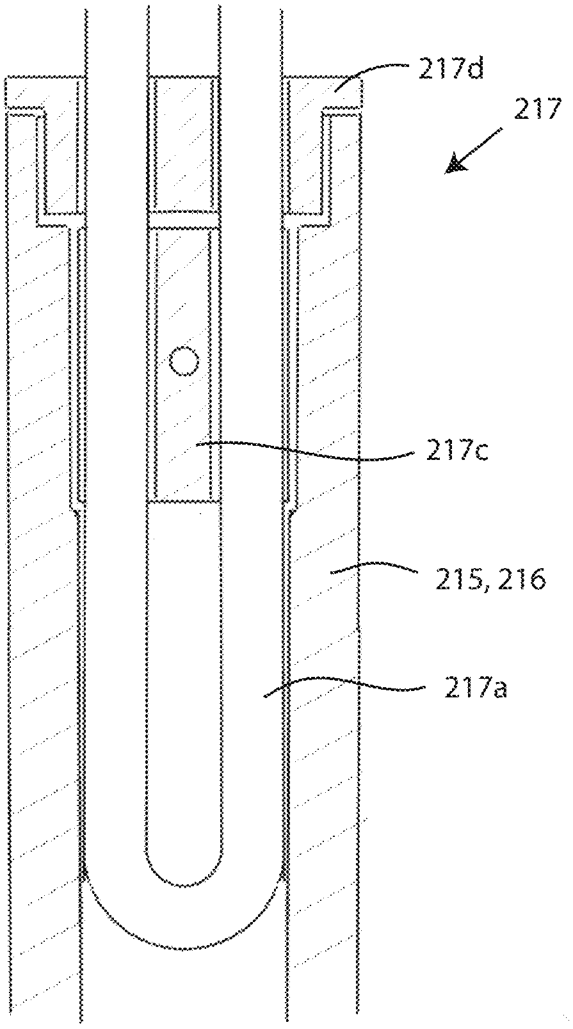
FIG. 14A depicts a sliding mechanism, in accordance with embodiments of the present invention.
Figure 14B:
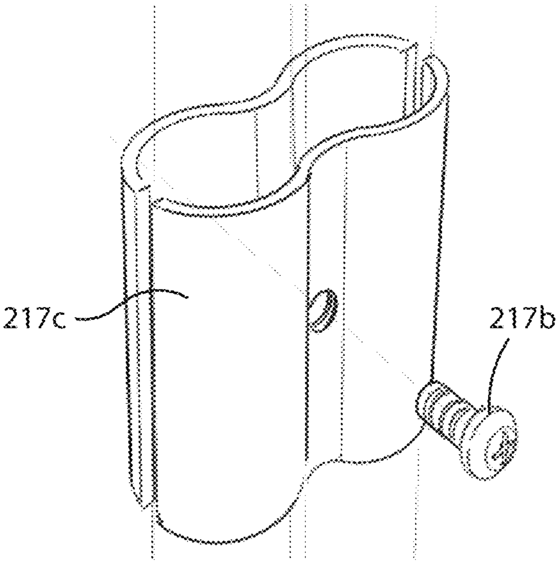
FIG. 14B depicts a clamp of the sliding mechanism, in accordance with embodiments of the present invention.

FIGS. 14A and 14B depict an exemplary embodiment of the sliding mechanism 217. The sliding mechanism 217 includes a bent metal rod 217*a* inserted within the leg section 215, 216 and connected to an end or portion of the center section 214. As the center section 214 is raised or lowered to a desired position, the bent metal rod 217*a* slides upward or downward within the leg section 215, 216 accordingly. Once the center section 214 is moved to a desired position, a fastener 217*b* is turned to tighten a clamp 217*c* onto the bent metal rod 217*a*, locking the bent metal rod 217*a* into position within the leg section 215, 216. Although one fastener 217*b* is shown, a second fastener can be used on the opposing side for added strength and locking effectiveness. In a locked position, movement of the center section 214 with respect to the leg section 215, 216 is hindered or otherwise prevented. To adjust the height of the center section 214 from a locked position, the fastener 217*b* is turned in an opposite direction to loosen the clamp 217*c*, which allows the bent metal rod 217*a* to slide freely within the leg section 215, 216. Once the desired position is achieved, the fastener 217*b* is turned to again tighten the clamp 217*c* onto the bent metal rod 217*a*. In the illustrated embodiment, the clamp 217*c* comprises two portions positioned on both sides of the bent metal rod 217*a* and have molded channels for receiving a straight section of the bent metal rod 217*a*. Moreover, the sliding mechanism 217 optionally includes a cap member 217*d* insertable over the bent metal rod 217*a* at the top end of the leg section 215, 216.

Referring back to FIGS. 12-13 the second portion 220 includes a first end 221 and a second end 222 that is opposite to the first end 221. The second portion 220 is defined by a stepping platform 225 that acts as a step or surface that the user can step onto to access or use an object associated with the structure. The stepping platform 225 has a width measured from side-to-side of the stepping platform 225 and a tread depth measured from the first end 221 to the second end 222. The surface 223 of the stepping platform 225 forms a continuous surface area to accommodate the user when the step assistant 200 is in use. The surface 223 can include friction elements, such as bumps, grooves, grip tape, knurling, raised surface projections, and the like, to prevent or hinder slipping while the user is standing on the stepping platform 225. Optionally, the surface 223 includes a plurality of openings extending through a thickness of the stepping platform 225 to reduce a total weight of the stepping platform 225. The thickness of the stepping platform 225 varies depending on a total weight that needs to be supported by the step assistant 200. Moreover, the second portion 220 of the configurable step assistant 200 is pivotally connected to the first portion 210. For instance, the stepping platform 225 is pivotally connected to the leg sections 215, 216 at a discrete point along an edge of the stepping platform 225 proximate the first end 221 of the stepping platform 225. In the embodiment illustrated in FIG. 12, the platform 225 is pivotally connected to the leg section 215 at a left, back corner of the stepping platform 225 and is pivotally connected to the leg section 216 at a right, back corner of the stepping platform 225. In alternative embodiments, the leg sections 215, 216 are attached to the stepping platform 225 at locations other than the corners of the stepping platform 225. Furthermore, various mechanical connections can be used to enable the pivoting of the stepping platform 225 with respect to the leg sections 215, 216. In one embodiment, the mechanical connection is a cylindrical pin or bolt attached to each side of the stepping platform 225 at the first end 221 that fits into a hole located on a side of the leg sections 215, 216, respectively. The holes are located on an inner face of the leg sections 215, 216. In another embodiment, the mechanical connection is a hinge that permits the stepping platform 225 to hingedly move with respect to the first portion 210. In another embodiment, the mechanical connection is a pivot lever.

Figure 15:
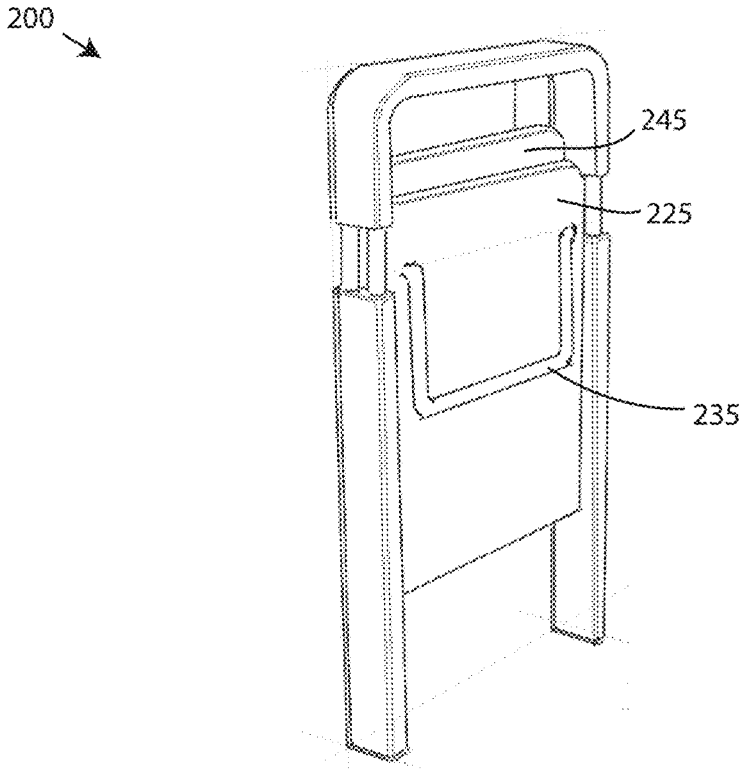
FIG. 15 depicts a perspective view of the configurable step assistant of FIG. 12 in a stowed position, in accordance with embodiments of the present invention.
Figure 16:
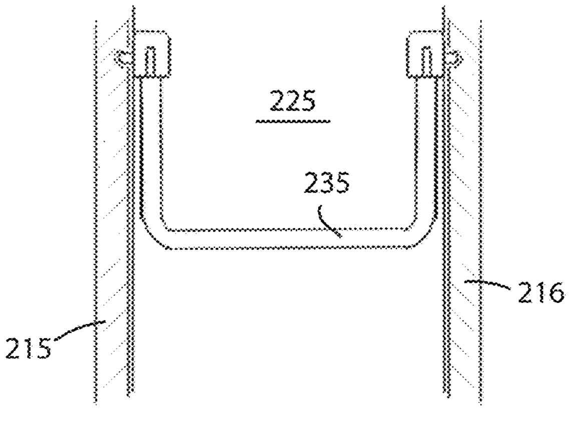
FIG. 16 depicts a front view of a support leg in a stowed position, in accordance with embodiments of the present invention.
Figure 17:
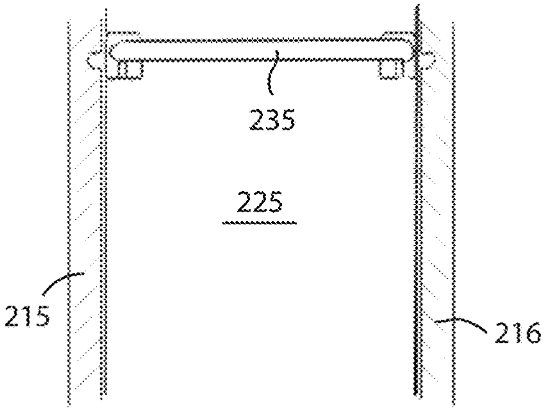
FIG. 17 depicts a front view of the support leg in an extended position, in accordance with embodiments of the present invention.

The third portion 230 of the step assistant 200 includes a support leg 235. The support leg 235 is configured to contact a floor for supporting a weight of the user when the user is standing on the second portion 220 or other steps of the step assistant. In the illustrated embodiment, the support leg 235 is a single bar having two vertical sections and a horizontal section that contacts the floor. In a stowed position, as shown in FIG. 15, the support leg 235 is attached to an underside of the stepping platform 225. Moreover, the third portion 230 of the step assistant 200 is pivotally connected to the second portion 220. FIG. 16 depicts the support leg stowed away against the stepping platform 225, and FIG. 17 depicts the support leg 235 in an operable position, extending laterally from the platform 225. Various mechanical connections can be used to enable the pivoting of the support leg 235 with respect to the stepping platform 225. In one embodiment, the mechanical connection is a cylindrical pin or bolt connecting the support leg 235 to the stepping platform 225 in a hinged manner. In another embodiment, the mechanical connection is a hinge that permits the support leg 235 to hingedly move with respect to the second portion 220. In another embodiment, the mechanical connection is a pivot lever.

The step assistant 200 optionally includes an additional step 245. In particular, the configurable step assistant 200 may include a fourth portion 240 pivotally connected to the first portion 210. In an exemplary embodiment, the pivotal connection between the fourth portion 240 and the first portion 210 includes an axle member that spans between the leg sections 215, 216; ends of the axle member may be positioned in corresponding holes on the leg sections 215, 216 at a same vertical position, respectively. The fourth portion 240 may include a bore that is sized and dimensioned to fit the axle member therethrough. The fourth portion 240 is moveable between a first position and a second position in a similar manner as described above with respect to the movement between the second portion 220 and the first portion 210. When the fourth portion 240 is in the second position, the fourth portion 240 defines the additional step 245 for accommodating the user at a higher elevation from a floor than an elevation from the floor provided by the stepping platform 225 of the second portion 220. The additional step 245 can be stowed away similar to the stepping platform 225 described above. Further, the additional step 245 may have a tread depth that is less than the tread depth of the stepping platform 225.

Furthermore, the configurable step assistant 200 includes a fifth portion 250 that connects the fourth portion 240 to the second portion 220. The fifth portion 250 is a strut or similar connector that connects the additional step 245 to the platform 225 while also allowing the additional step 245 to move in sync with the platform 225 between a first position and a second position. The fifth portion 250 can include two struts connected on both sides of the additional step 245 and platform 225. A slide 251 positioned on a side edge of the platform 225 allows for the end of the connector to move side-to-side as the steps are being repositioned. The slide 251 may be a wire form slide that allows for clean, parallel collapsing of the step assistant 200.

Figure 18A:
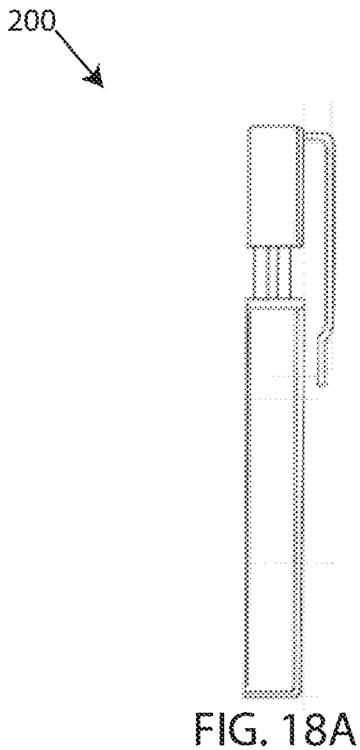
FIG. 18A the configurable step assistant of FIG. 12 in a first position, in accordance with embodiments of the present invention.
Figure 18B:
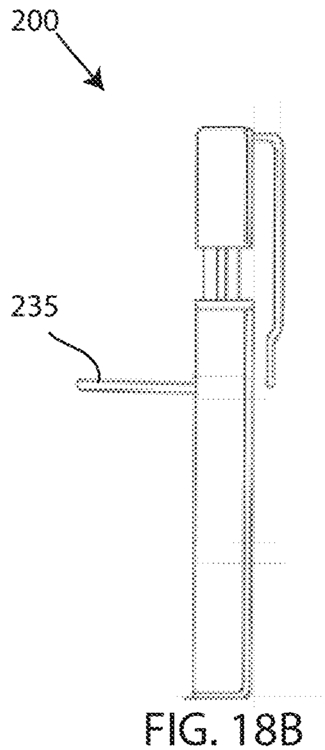
FIG. 18B depicts the configurable step assistant of FIG. 12 moved from the first position, in accordance with embodiments of the present invention.
Figure 18C:
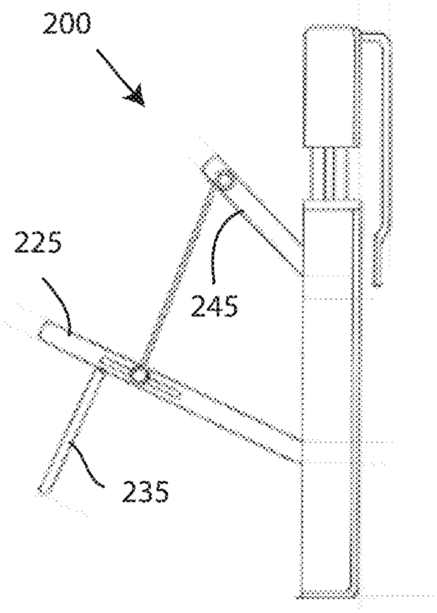
FIG. 18C depicts the configurable step assistant of FIG. 12 further moved from the first position, in accordance with embodiments of the present invention.
Figure 18D:
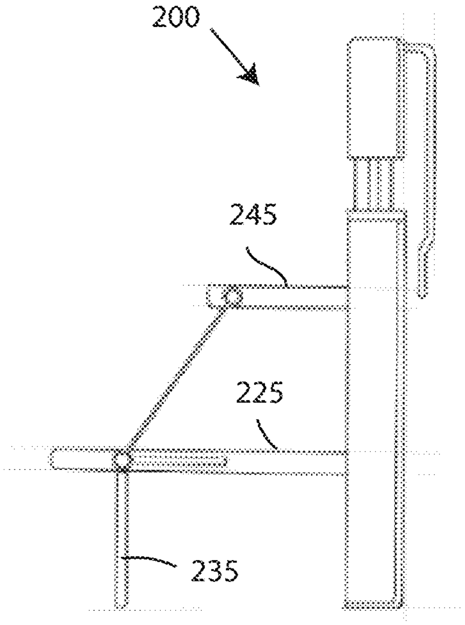
FIG. 18D depicts the configurable step assistant of FIG. 12 fully moved from the first position to a second position, in accordance with embodiments of the present invention.

The manner in which the configurable step assistant 200 is configured between an operable position and a stowed position will now be described. FIGS. 18A-18D depict various positions of the step assistant 200 from a stowed position to a locked position, in accordance with embodiments of the present invention. FIG. 18A depicts a first, fully stowed/collapsed position. In this stowed position, the step assistant 200 has a narrow profile to maximize walkways near the structure or to fit within an interior region of the structure. To initiate a use of the step assistant 200, a user may pull the support leg 235 outwardly; this position is shown in FIG. 18B. Because the support leg 235 is mechanically fixed to the second portion 220, the second portion 220 is also pulled outwardly and/or towards a floor surface. Similarly, in embodiments with additional step 245, because the additional step 245 is mechanically fixed to the second portion 220, the additional step 245 is also pulled outwardly and/or towards the floor surface, as depicted in FIG. 18C. FIG. 18D depicts the second position, in which a user can be accommodated by the step assistant 200. When the second portion 220 (e.g. stepping platform 225) is in the second position, the second portion 220 defines a step for accommodating the user. A latch or similar mechanical means located on one or both of the leg sections 215, 216 can be used to maintain the stepping platform 225 in the vertical orientation of the first position or the horizontal position of the second position.

In the operable position, the step assistant 200 can be stepped on by the user to access, reach or user an object associated with the structure. By way of example, the support leg 235 is pulled by the user which causes the platform 225 and the additional step 245 to fold down into the second position so that the user can step onto and stand on the step assistant 200 to use the faucet of the bathroom sink from an elevation higher than the floor. In the operable position, the configurable step assistant 200 takes up floor space on the floor because the stepping platform 225 extends laterally from the front surface of the cabinet and the support leg 235 rests on the floor 2. In bathrooms where a walkway between the bathroom sink and another object, such as a door, a doorway, wall or a tub, is limited, the presence of the step assistant 200 further reduces or blocks the walkway. To maximize a clearance around the structure (e.g. clear the walkway), the configurable step assistant 200 can be moved into a stowed position when the step assistant 200 is not in use. In the stowed position, a footprint of the step assistant 200 is eliminated and a distance that the configurable step assistant 200 extends from the front surface 3 of the structure1 is reduced or minimized. In cases where the step assistant mounts to an inner surface of the door, the footprint of the step assistant 200 is entirely removed because the step assistant 200 resides within the cabinet. To move the step assistant 200 from the operable position to the stowed position, the user grips one or more of the support leg 235, the stepping platform 225, or the additional step 245 and lifts upwardly to stow in a vertical orientation parallel with the structure in a single motion. In the stowed position, the configurable step assistant 200 does not take up key floor space on the floor because the stepping platform 225 does not extend laterally from the front surface of the structure and the support leg 235 are off of the floor and instead folded flat onto the stepping platform 225. In bathrooms where the walkway between the bathroom sink and another object, such as a wall or a tub, is limited, the ability to stow away the step assistant 200 to free up the walkway can be appreciated by the user. Additionally, the configurable step assistant 200, when attached to the structure 1, can act as a safety measure/child-resistant solution. By way of example, if the connection element 211 is attached to both doors in a side-by-side door arrangement of a cabinet, the configurable step assistant 200 can prevent the doors from being fully opened and accessed by a young child. Alternatively, if the connection element 211 is attached to one cabinet door, the configurable step assistant 200 can also be slid or moved along the door while in the stowed-away position to allow access to opening the cabinet door.

Referring now to FIGS. 1-18D, a method includes the step of providing a configurable step assistant 100, 101 for attachment to a structure 1, the configurable step assistant 100, 101 including a first portion 10 configured to be attached to the structure 1, a second portion 20 pivotally connected to the first portion 10, and a third portion 30 pivotally connected to the second portion 20. The configurable step assistant 100, 101 is configured to be moved into a stowed position to maximize a clearance area around the structure and moved into an operable position to provide a step for accommodating a user at a higher elevation with respect to a floor surface 2.

In another embodiment, the configurable step assistant can be mounted on the inside of a cabinet door and the steps can be folded down from side-to-side with the cabinet door open. For example, when a user opens the cabinet door, the step assistant 100, 101, 200 is positioned such that the user can pull to the left or to the right, and the steps will fold down at a 90-degree angle from the open cabinet door.

In another embodiment, a configurable step assistant includes a plurality of support legs that are fixedly connected to each other by a connector so that folding or otherwise manipulating one of the legs will result in movement of the other leg. In this way, additional legs add to the stability and support of the steps but do not add an additional user task to fold down or up the additional legs.

In another embodiment, a child-safety lock may be employed to prevent a child from unlocking or folding down the steps of the step assistant. The child-safety lock can be a pin and a hook fastened to the underside of at least one support leg that prevents detachment from the stowed position with respect to the step platform.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A configurable step assistant comprising:

a first portion comprising a first leg section, a second leg section, a center section, and a sliding mechanism, the first leg section and the second leg section each configured to contact a floor surface at two different points on the floor surface, the center section having a first curved section and a second curved section, the first curved portion contacting the first leg section when the sliding mechanism is in an initial position and the second curved portion contacting the second leg section when the sliding mechanism is in the initial position, wherein, when the sliding mechanism is engaged to be moved from the initial position, the first curved portion no longer contacts the first leg section and the second curved portion no longer contacts the second leg portion, and the center section is raised from an initial position to increase a vertical height of the center section with respect to the floor surface, the center section, the first curved portion, and the second curved portion being moveable together as a single unit when the center section is raised from the initial position and sharing a same cross-section that is wider in a direction parallel with the floor surface than in a direction perpendicular with the floor surface, the center section having a connection element configured to engage a structure at a location above the floor surface, wherein the connection element includes a first section that extends horizontally with respect to the floor surface to span a thickness of a structural element of the structure defined by a first side that faces away from the structure and a second side that faces towards the structure, and a second section that extends vertically downward towards the floor surface along the second side of the structural element of the structure, the connection element being moveable with the center section such that when the center section is raised from the initial position, the connection element is vertically raised higher than a top edge of the structure so that the connection element is lowered onto the top edge of the structure as the center section is lowered using the sliding mechanism;

a second portion pivotally connected to the first portion, the second portion being moveable between a first position and a second position with respect to the first portion, the second portion being a first step; and a third portion pivotally connected to the first portion, the third portion being moveable between a first position and a second position with respect to the second portion, the third portion being a second step located below the first step; and a connector attached to a side edge of the first step extending downwardly towards the second step to make contact with the third portion;

wherein, when the second portion is in the second position and the third portion is in the second position, the second portion and the third portion each define a step for accommodating a user, and the third portion supports at least a portion of a load applied to the second portion via the connector;

wherein the second step is a platform extending from a front edge to a back edge, the back edge being located proximate the at least one leg section of the first portion, when the third portion is in the second position;

wherein the third portion includes at least one support leg configured to contact the floor surface for supporting a load applied to the third portion and a portion of the load applied to the second portion;

wherein, when the configurable step assistant is in contact with the floor surface, the first leg section and the second leg section continuously each extend vertically higher from the floor surface than the first step;

wherein the first step and the second step are the only steps of the configurable step assistant such that the configurable step assistant has a total of two steps, and the connector is located only between the two steps.

2. The configurable step assistant of claim 1, wherein, when the second portion is in the first position, the second portion is parallel to the first portion to reduce a footprint on the floor surface that supports the structure.

3. The configurable step assistant of claim 1, wherein, when the third portion is in the first position, the third portion is parallel with the second portion to reduce a distance that the configurable step assistant extends from a front side of the structure.

4. A configurable step assistant for use with a cabinet, comprising:

a standing structure having two back leg sections comprised of a first leg section and a second leg section each configured to contact a floor surface at two different points on the floor surface, and a center section having a first curved section and a second curved section, the first curved portion contacting the first leg section when a sliding mechanism is in an initial position and the second curved portion contacting the second leg section when the sliding mechanism is in the initial position, wherein, when the sliding mechanism is engaged to be moved from the initial position, the first curved portion no longer contacts the first leg section and the second curved portion no longer contacts the second leg portion, and the center section is raised from an initial position to increase a vertical height of the center section with respect to the floor surface, the center section, the first curved portion, and the second curved portion being moveable together as a single unit when the center section is raised from the initial position and sharing a same cross-section that is wider in a direction parallel with the floor surface than in a direction perpendicular with the floor surface;

a connection element operably connected to the center section and configured to engage a top edge of a door of the cabinet, wherein the connection element includes a first portion that extends outwardly from the center section to span a thickness of the top edge of the door, and a second portion connected to the first portion that extends downward along a side of the door adjacent to the top edge of the door, the connection element being moveable with the center section such that when the center section is raised from the initial position, the connection element is vertically raised higher than the top edge of the structure so that the connection element is lowered onto the top edge of the structure as the center section is lowered using the sliding mechanism;

a stepping platform pivotally connected to the two back leg sections, the stepping platform residing parallel with respect to a front surface of the cabinet in a first position and extending laterally with respect to the front surface of the cabinet in a second position;

an additional stepping platform pivotally connected to the two back leg sections, the additional stepping platform located above the stepping platform and being moveable between a first position where the additional stepping platform resides parallel with respect to the front surface of the cabinet and extends laterally with respect to the front surface of the cabinet in a second position, wherein, when the additional stepping platform is in the second position, the additional stepping platform accommodates a user at a higher elevation from a floor than an elevation from the floor provided by the stepping platform;

at least one support leg pivotally connected to the base of the stepping platform and extending from the stepping platform to contact the floor; and a connector attached to a side edge of the additional stepping platform that extends downwardly towards the stepping platform;

wherein, when the stepping platform is in the second position and the additional stepping platform is in the second position, at least a portion of a load applied to the additional stepping platform by the user stepping on the additional stepping platform is supported by the stepping platform via the connector;

wherein the stepping platform and the additional stepping platform are the only steps of the configurable step assistant such that the configurable step assistant has a total of two steps, and the connector is located only between the two steps.

5. The configurable step assistant of claim 4, wherein, when the stepping platform is in the first position, a footprint on a floor that supports the cabinet is reduced and a distance that the configurable step assistant extends from the front surface of the cabinet is reduced with respect to the second position of the stepping platform.

6. The configurable step assistant of claim 4, wherein the additional stepping platform comprises: a reduced tread depth than the stepping platform.

7. The configurable step assistant of claim 4, wherein a position of the two leg sections remains the same in both the first position and the second position.

8. The configurable step assistant of claim 1, wherein the second step is pivotally connected to the at least one leg section of the first portion about a pivot axis that extends between two legs of the at least one leg section of the first portion.

* * * * *